(12) United States Patent
Qian et al.

(10) Patent No.: US 6,314,002 B1
(45) Date of Patent: Nov. 6, 2001

(54) VOLTAGE CLAMPING SYSTEM AND METHOD FOR A DC/DC POWER CONVERTER

(75) Inventors: Jinrong Qian, Croton-on-Hudson; Da Feng Weng, Yorktown Heights, both of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/716,919

(22) Filed: Nov. 20, 2000

(51) Int. Cl.$^7$ .................................................. H02M 3/335
(52) U.S. Cl. ..................... 363/21.04; 363/21.08; 363/56.12
(58) Field of Search ........................ 363/16, 20, 21.01, 363/21.04, 21.08, 21.09, 55, 56.01, 56.12

(56) References Cited

U.S. PATENT DOCUMENTS

| | | |
|---|---|---|
| Re. 36,098 | 2/1999 | Vinciarelli . |
| 3,621,363 | 11/1971 | Glanman . |
| 4,274,133 | 6/1981 | Cuk et al. . |
| 4,355,352 | 10/1982 | Bloom et al. . |
| 4,441,146 | 4/1984 | Vinciarelli . |
| 4,561,046 | 12/1985 | Kuster . |
| 4,675,796 | 6/1987 | Gautherin et al. . |
| 4,688,160 | 8/1987 | Fraidlin . |
| 4,736,285 | 4/1988 | Cohen . |
| 4,760,512 | 7/1988 | Loftus . |
| 4,783,727 | 11/1988 | Neumann . |
| 4,805,079 | 2/1989 | Van Buul . |
| 4,899,270 | 2/1990 | Bond . |
| 5,019,957 | 5/1991 | Wilkinson . |
| 5,055,991 | 10/1991 | Carroll et al. . |
| 5,075,838 | 12/1991 | Schnetzka et al. . |
| 5,260,607 | 11/1993 | Kinbara . |
| 5,379,206 | 1/1995 | Davidson . |
| 5,430,633 | 7/1995 | Smith . |
| 5,521,807 | 5/1996 | Chen et al. . |
| 5,615,094 | 3/1997 | Cosentino et al. . |
| 5,694,304 | 12/1997 | Telefus et al. . |
| 5,731,966 | 3/1998 | Liu . |
| 5,745,353 | 4/1998 | Sato et al. . |
| 5,828,559 | * 10/1998 | Chen ............................. 363/56.12 X |
| 5,883,793 | 3/1999 | Farrington . |
| 5,883,795 | 3/1999 | Farrington . |
| 5,896,284 | 4/1999 | Murasato et al. . |
| 5,982,638 | 11/1999 | Tang et al. . |
| 5,999,419 | 12/1999 | Marrero . |
| 6,005,782 | 12/1999 | Jain et al. . |
| 6,061,254 | 5/2000 | Takegami . |
| 6,115,271 | 9/2000 | Mo . |
| 6,130,824 | 10/2000 | Hosotani . |

* cited by examiner

*Primary Examiner*—Jessica Han
(74) *Attorney, Agent, or Firm*—Steven R. Biren

(57) ABSTRACT

A voltage boost power converter circuit, having an input inductor, active switch, and a transformer having primary, secondary and auxiliary windings. A clamping capacitor and a first passive switch are in series across the primary winding. The auxiliary winding and a second passive switch are in series, connected to the node between the clamping capacitor and first passive switch. The active switch is connected between ground the primary winding. A bulk capacitor forms a series loop including the active switch and primary winding. The method efficiently resets a the transformer, by transferring power to a load through the primary winding, and discharging a clamping capacitor through a separate inductively linked winding of the transformer during an ON state; and clamping the active switch voltage with the clamping capacitor, charging the clamping capacitor with a leakage inductance of the transformer, and charging the bulk capacitor during an OFF state.

20 Claims, 4 Drawing Sheets

VOLTAGE CLAMPING SYSTEM AND METHOD FOR A DC/DC POWER CONVERTER

FIELD OF THE INVENTION

The present invention relates to the field of switching power transfer devices, and more particularly to an improved voltage clamping method for a DC/DC power converter.

BACKGROUND OF THE INVENTION

The present invention relates to the class of DC-to-DC converters that incorporate the topology represented in FIG. 1. A converter in that class is referred to as a "single ended forward" converter because power flow is gated by a single switch and energy is transferred forward, from the primary winding to the secondary winding of the transformer, during the ON period of the switch. Converters in this class present a unique problem, in that the conversion topology does not inherently define the mechanism by which the transformer's core is to be reset during the OFF period of the switch. A number of solutions are proposed in the prior art, each with different tradeoffs in the cost of the converter, as well as its efficiency and power density.

A well-known prior art DC/DC forward converter is shown in FIG. 2A, where $L_k$, $D_s$ and $C_{ds}$ are the leakage inductance of the transformer T, body diode and internal capacitance of switch S, respectively. Winding N3, coupled with windings N1 and N2, is used to reset the transformer T. The typical switching waveforms of FIG. 2A are shown in FIG. 2B. When switch S is turned off at $t_2$, energy stored in the leakage inductance $L_k$ is released to charge the capacitance $C_{ds}$, which causes a high voltage spike across switch S. After the leakage energy is completely released, the voltage across switch S reaches its steady-state value. As a result, high voltage rating voltage S would be required.

To eliminate this voltage spike, a number of circuit topologies have been reported in the literature. Among them, the R-C-D snubber is one of the most popular ways to minimize the voltage spike as shown in FIG. 3. The snubber circuit consists of diode D1, capacitor $C_s$ and resistor $R_s$. When switch S is turned off, the leakage current flows through diode D1 and charges capacitance $C_s$. If capacitance $C_s$ is relatively large enough, the voltage across $C_s$ roughly does not change so as to clamp the voltage. In this case, the leakage energy of the transformer is first charged to $C_s$ and then is dissipated by the resistor $R_s$. As a result the converter has lower conversion efficiency, i.e., loss of the energy inherent in the spike to heat.

The leakage inductance of the transformer in a conventional DC/DC forward converter causes a voltage spike across the power switch when the power switch turns off. Usually a circuit, such as R-C-D (resistor, capacitor, diode) snubber or an active clamp circuit, is used to absorb this voltage spike. The leakage energy of the transformer is dissipated in the R-C-D snubber circuit.

A number of known designs seek to recover this energy. These methods typically require an additional active switch to recover the leakage energy of the transformer.

See, Moshe Domb, "Nondissipative turn-off snubber alleviates switching power dissipation second-breakdown stress and Vce overshoot: analysis, design procedure and experimental verification," IEEE Power Electronics Specialists Conference (1982); U.S. Pat. No. 4,783,727, "DC/DC Converter"; U.S. Pat. No. 6,115,271, "Switching Power Converters With Improved Lossless Snubber Networks", U.S. Pat. No. 5,260,607, "Snubber Circuit For Power Converter", each of which is incorporated herein by reference.

Farrington, U.S. Pat. No. 5,883,795; Farrington, U.S. Pat. No. 5,883,793; and Gautherin et al., U.S. Pat. No. 4,675,796, each of which is expressly incorporated herein by reference, are discussed below.

See also, R. Watson, F. C. Lee and G. C. Hua, "Utilization of an active clamp circuit to achieve soft-switching in flyback converters" IEEE Power Electronics Specialists Conference (1994).

U.S. Pat. No. 6,108,218, "Switching Power Supply with Power Factor Control", provides two embodiments. In a first embodiment, shown in FIGS. 1 and 2 thereof, no snubber circuit to recycle the leakage energy of the transformer is shown. FIGS. 3 and 4 thereof provide an additional active switch as part of the snubber.

U.S. Pat. No. 6,061,254, "Forward Converter With Active Clamp Circuit", provides a circuit having three inductively linked transformer windings and at least two active switches.

U.S. Pat. No. 5,982,638, "Single stage power converter with regenerative snubber and power factor correction" provides a capacitor 44 in FIG. 1, which is not only used as a snubber capacitor, but also used to achieve power factor correction, and therefore handles the main power flow from the input to the output. Therefore, the current flowing through this capacitor 44 is very large, which requires a capacitor large in size and value. In this circuit, the recovery of energy from the snubber capacitor 44 occurs by transfer to the input inductor 38 when switch 22 turns on. Since the energy stored in capacitor 44 is large, which causes higher power loss in the circuit. As a result, it has lower power conversion efficiency. The capacitance of capacitor 44 is determined by the input power and satisfies the power factor and input current harmonics requirements.

U.S. Pat. No. 5,991,172, "AC/DC flyback converter with improved power factor and reduced switching loss," provides a third transformer winding which is not used to recover the leakage energy of the transformer, but rather to reduce the switching loss and improve the power factor. The leakage energy is dissipated by the circuit. Thus, it provides no substantial improvement in efficiency over a dissipative R-C-D snubber.

U.S. Pat. No. 5,999,419, "Non-isolated Boost Converter With Current Steering" relates to a buck boost converter having a tree-winding transformer.

U.S. Pat. No. 5,896,284, "Switching Power Supply Apparatus With a Return Circuit That Provides A Return Energy Ro A Load", relates to a power supply circuit which utilizes leakage inductance energy to enhance efficiency, for example with a magnetically isolated inductor.

U.S. Pat. No. 5,615,094, "Non-Dissipative Snubber Circuit For A Switched Mode Power Supply", relates to a snubber circuit for a secondary circuit of a power supply.

U.S. Pat. No. 5,694,304, "High Efficiency Resonant Switching Converters"; and U.S. Pat. No. 5,379,206, "Low Loss Snubber Circuit With Active recovery Switch" each provide a dual active switch architecture converter.

U.S. Pat. No. 5,055,991, "Lossless Snubber", relates to a converter circuit having an active switch and a transformer with five inductively coupled windings.

U.S. Pat. No. 5,019,957, "Forward Converter Type of Switched Power Supply", relates to a dual active switch forward power converter.

U.S. Pat. No. 4,805,079, "Switched Voltage Converter", provides a converter with a snubber circuit.

U.S. Pat. No. 4,760,512, "Circuit for Reducing Transistor Stress and Resetting the Transformer Core of a Power Converter", relates to a single active switch, triple inductively coupled winding transformer forward converter.

U.S. Pat. No. 4,736,285 relates to a "Demagnetization circuit for Forward Converter", having two active switches.

U.S. Pat. No. 4,688,160, "Single Ended Forward Converter With Resonant Commutation of Magnetizing Current", provides a forward converter employing a resonating capacitor to reset the transformer core.

U.S. Pat. No. 4,561,046, "Single Transistor Forward Converter With Lossless magnetic Core Reset and Snubber Network", relates to a forward converter having a single switch and a transformer having three inductively linked windings.

U.S. Pat. No. 4,441,146, "optimal Resetting of the Transformer's Core in Single Ended Forward Converters", provides a forward DC/DC converter having a transformer with three inductively coupled windings.

U.S. Pat. No. 4,355,352, "DC To DC Converter", relates to a converter having three coupled inductor windings, with two capacitors and two switching devices (one active and one passive), to provides a ripple free input and output current.

SUMMARY AND OBJECTS OF THE INVENTION

The present invention provides a forward DC/DC converter circuit, in which leakage energy of a transformer is efficiently recycled to the output, and a voltage spike across the switch reduced, by clamping the voltage across the switch using a winding-capacitor-diode snubber inductively coupled to the transformer.

Accordingly, the voltage across the main switch due to the leakage inductance of the transformer is clamped, achieving a reduction in peak voltage across the switch, and the energy inherent in the voltage spike is recaptured, to increase overall circuit efficiency. Further, the circuit may be constructed using a single active switch and a single inductively coupled transformer structure. Thus, the cost is low and the circuit takes up little additional space.

The snubber capacitor $C_s$ only deals with the leakage energy, which is only a small portion of the total power handled by the circuit. This allows use of a relatively small snubber capacitor. In addition, the size of the capacitor $C_s$ is relatively independent of the input power level.

The leakage energy is recovered through an extra winding of the transformer, and becomes the part of the magnetizing energy when the main switch S is turned on.

Thus, it is an object of the invention to provide a snubber for a forward DC/DC converter providing voltage clamping across the active switch and which recycles energy from the clamped transient, without requiring a separate active switch nor separate inductor.

It is also an object of the invention to provide a forward DC/DC converter circuit having an active switch, diode, capacitor, transformer and a winding-capacitor-diode snubber for reducing a voltage spike transient across the active switch, wherein the winding-capacitor-diode snubber is configured to transfer energy from the voltage spike transient to the output through an inductor coupled to the transformer. The snubbing energy recovery switching is passive, through the diodes, and therefore no additional active switch is required.

It is a further object of the invention to provide a method of operating a forward DC/DC converter for improved efficiency, the forward DC/DC converter circuit having an active switch, diode, capacitor, transformer and an winding-capacitor-diode snubber, for reducing a voltage spike transient across the active switch, wherein the winding-capacitor-diode snubber passively switches to transfer energy from the voltage spike transient to the output through an inductor coupled to the transformer.

It is an object of a voltage boost feed forward converter circuit embodiment according to the present invention to provide a circuit, having an active switch controlling a current through input inductor, a transformer having a primary winding, and an output circuit connected to a secondary winding, comprising a clamping capacitor and a first passive switch in series across the primary winding, an auxiliary winding of the transformer and a second passive switch, in series, connected to the node between the clamping capacitor and first passive switch and ground, the active switch being connected between ground and a side of the primary winding opposite the first passive switch, and a bulk capacitor forming a series loop including the active switch and primary winding.

It is an object of a method of efficiently resetting a voltage boost forward DC/DC converter embodiment of the invention to transfer power to a load through a primary winding of the transformer, charge a clamping capacitor and discharge a bulk capacitor during an active switch conduction cycle; and clamp a voltage across the active switch with the clamping capacitor, passively discharge the clamping capacitor through a separate inductively linked winding of the transformer, and charge the bulk capacitor during an active switch non-conduction cycle, to efficiently transfer energy corresponding to a switching transient to the load.

The converter may be controller in known manner, for example based on waveform in an output circuit connected to the secondary winding. The circuit may have a plurality of secondary windings. The respective windings are preferably electrically isolated. A control may be provided to control the active switch in known manner.

The first and second passive switches may each comprise a semiconductor diode, while the active switch is preferable a metal oxide silicon field effect transistor (MOSFET). The circuit may rely on an intrinsic MOSFET body diode, or provide an external or associated diode. The bulk capacitor preferably has a larger capacitance than said clamping capacitor.

The output circuit may include a half-bridge rectifier across the secondary winding and a capacitor-inductor ripple filter.

The circuit is preferably configured such that the auxiliary winding of the transformer, the second passive switch, the first passive switch, and the bulk capacitor form a series loop. The auxiliary winding preferably transfers energy from a switching transient of said active switch to said secondary winding. The auxiliary winding of the transformer and the second passive switch are preferably connected through the first passive switch to a common node of the primary winding and the bulk capacitor, the bulk capacitor being ground referenced. The first and second passive switches comprise, for example, semiconductor diodes which are reverse biased during steady state operation when the active switch is conducting. A leakage energy from the primary winding is preferably transferred from the clamping capacitor to the auxiliary winding when the active switch is non-conducting, whereby the leakage energy is inductively coupled to the secondary winding. Various modifications of the arrangement are possible, which do not essentially alter the function of the circuit to limit voltage across the switch and efficiently recapture energy from the turning off of the active switch.

The input inductor is preferably magnetically isolated from said transformer.

In a power factor correction embodiment, the active switch is connected in series with the input inductor to a rectified output of a full wave rectifier.

These and other objects will become apparent from a review of the Detailed Description of the Preferred Embodiments and drawings.

BRIEF DESCRIPTION OF THE DRAWINGS

The preferred embodiments of the invention will now be explained with reference to the drawings, in which:

FIG. 2B exemplifies the operation of the reset mechanism in FIG. 2a;

DETAILED DESCRIPTION OF THE PREFERRED EMBODIMENTS

COMPARATIVE EXAMPLE 1

Figure 1:
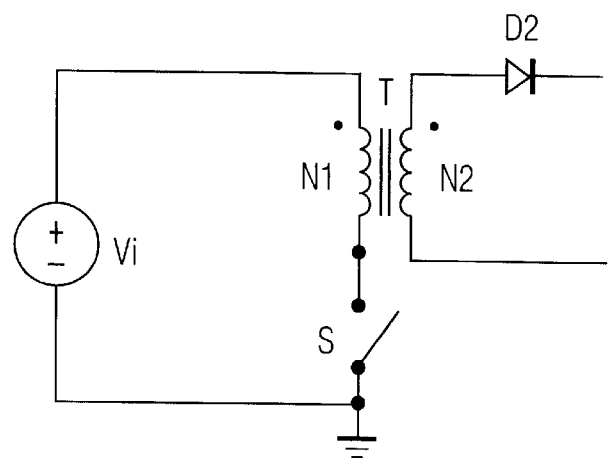
FIG. 1 defines a prior art general class of single ended forward converters.
Figure 5:
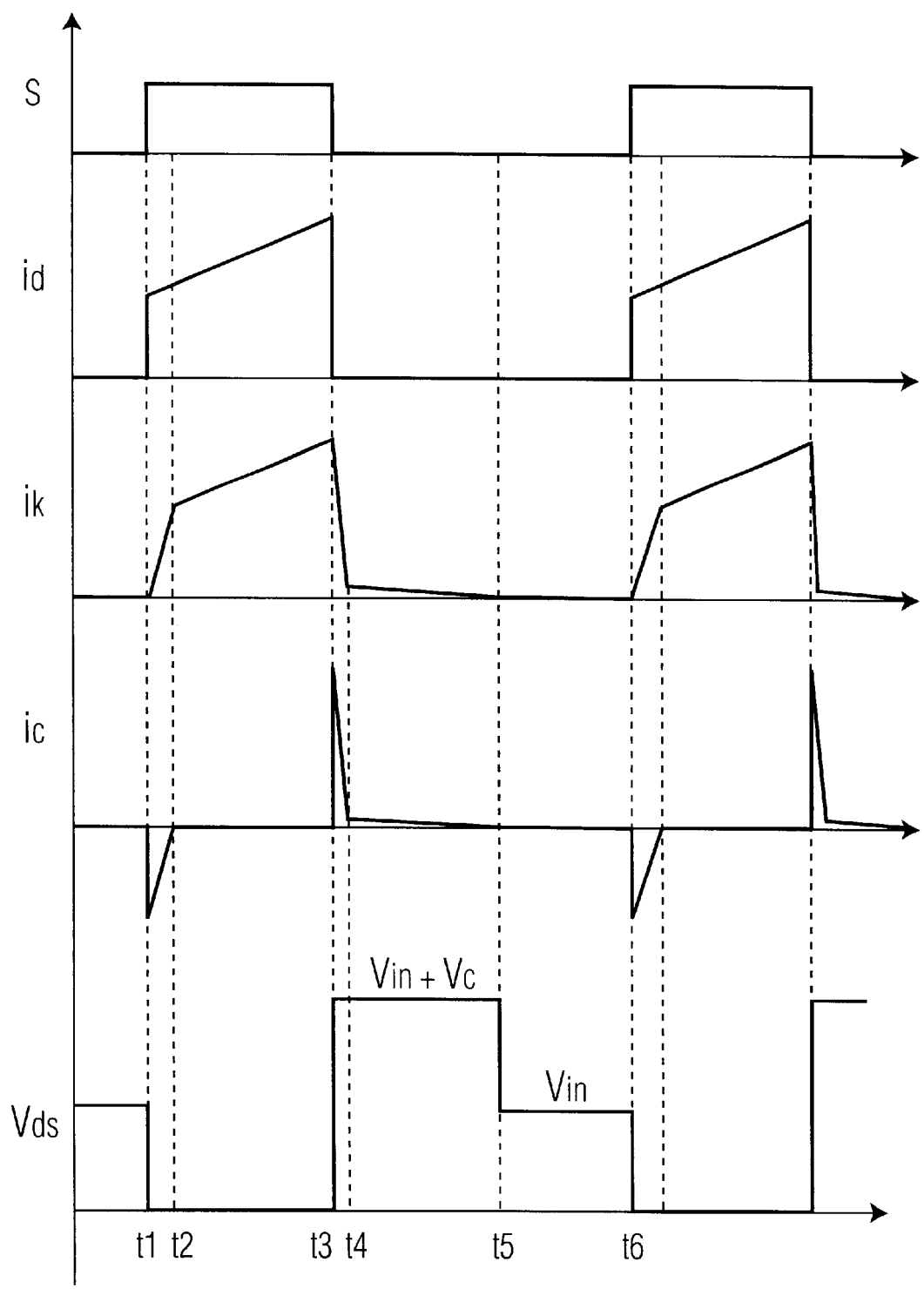
FIG. 5 shows switching waveforms of the circuit according to FIG. 4.

A circuit according to Farrington, U.S. Pat. No. 5,883,795, expressly incorporated herein by reference, specifically FIG. 1 thereof, is shown in FIG. 5. See also, Farrington, U.S. Pat. No. 5,883,793, and Gautherin et al., U.S. Pat. No. 4,675,796, expressly incorporated herein by reference.

$D_s$, and $C_{ds}$ are the body diode, and internal junction capacitance of switch S, respectively. $L_k$ is the leakage inductance of the transformer T. Capacitor $C_s$ is the clamping capacitor to clamp the voltage across switch S during the switch off period. Winding N3 is inductively coupled with the transformer T. Diode D3 is in series with winding N3, to stop the resonance between leakage inductance $L_k$ and clamping capacitor $C_s$ through a loop $V_{in}$-N1-$L_k$-$C_s$-D3-N3.

Figure 4:
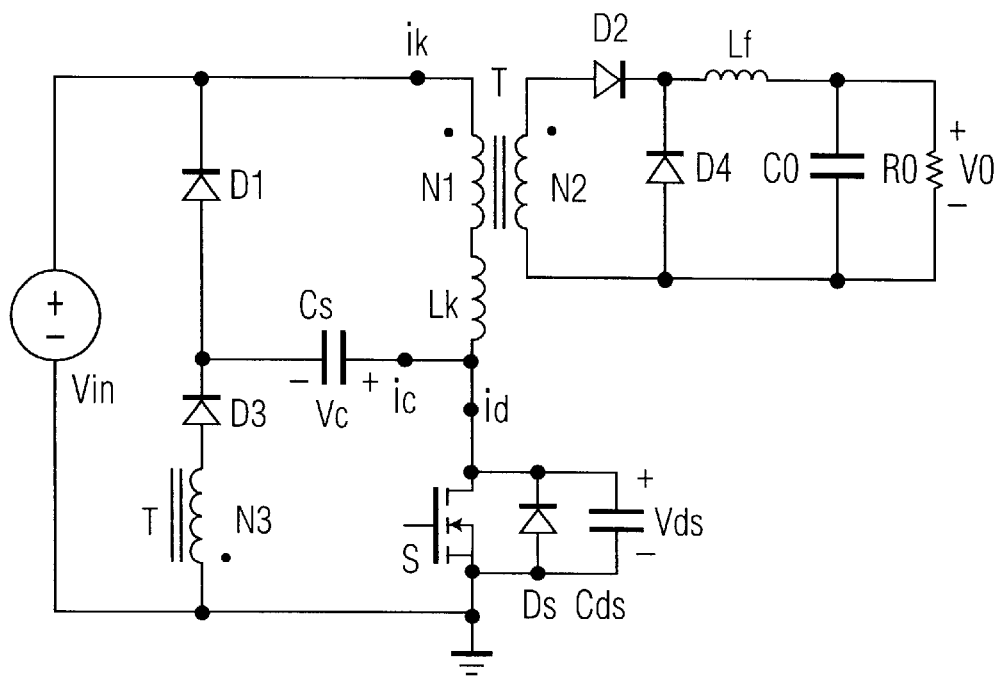
FIG. 4 shows a clamp-mode Forward DC/DC converter.

FIG. 5 shows the typical switching waveforms of the circuit shown in FIG. 4. Before $t_1$, switch S is off, and leakage energy is transferred to capacitor $C_s$. When S is turned on at $t_1$, voltage $V_c$ is applied to the winding N3. The discharging current of capacitor $C_s$ and input source $V_{in}$ supplies the load current, because winding N3 is coupled with winding N2. Due to the discharge nature of capacitor $C_s$, the discharging current becomes smaller with the time, and the current from the input source $V_{in}$ becomes larger until at $t_2$, where the load current is fully provided by the input source, and capacitor $C_s$ stops discharging. After $t_2$, the converter operates as a conventional forward converter to deliver power from source to the load until $t_3$, where switch S is turned off.

At $t_3$, switch S is turned off, the leakage current first charges the output capacitance $C_{ds}$, and then charges clamp capacitor $C_s$ through diode D1. The capacitor voltage $V_c$ is connected in winding N1, and induces a voltage across winding N3. When the induced winding voltage in N3 exceeds to the input voltage $V_{in}$, Diode D3 begins to conduct, and the magnetizing energy is then returned to the input source. The clamp voltage $V_c$ is determined by $$V_c = \frac{N_1}{N_3} V_{in}$$

As a result, the voltage across switch S during its off period is given by $$V_{ds,max} = \left(1 + \frac{N_1}{N_3}\right) V_{in}.$$

When the transformer is completely reset at $t_4$, Diode D1 and D3 are naturally turned off.

Figure 2A:
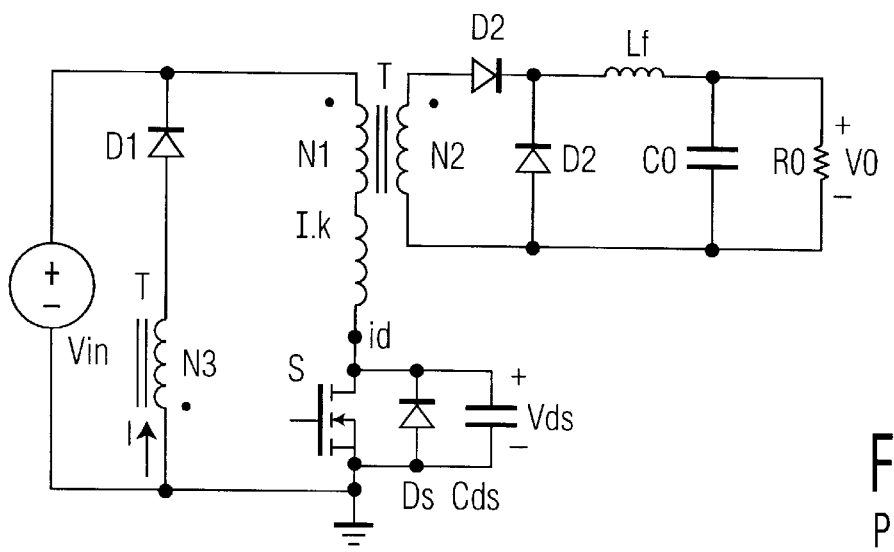
FIG. 2A shows a prior art reset circuit including an auxiliary transformer winding.
Figure 2B:
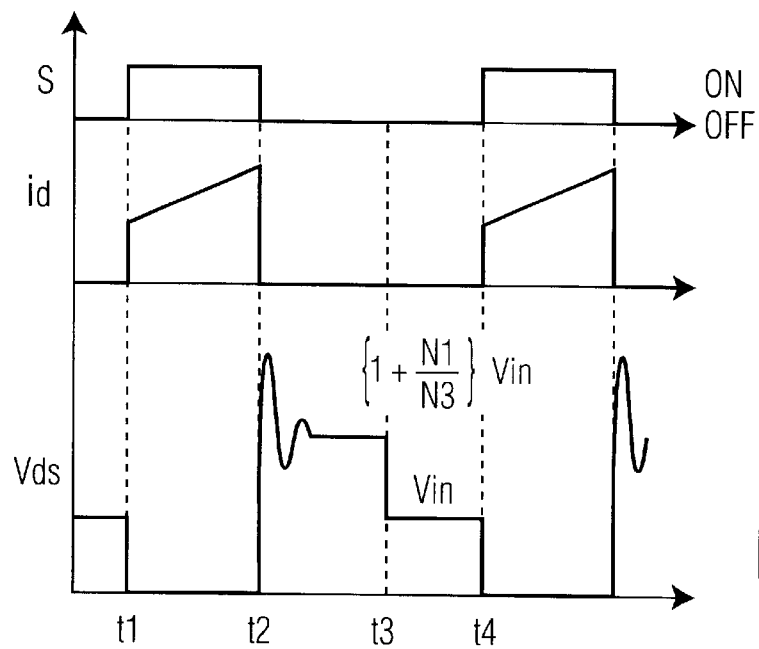
Figure 3:
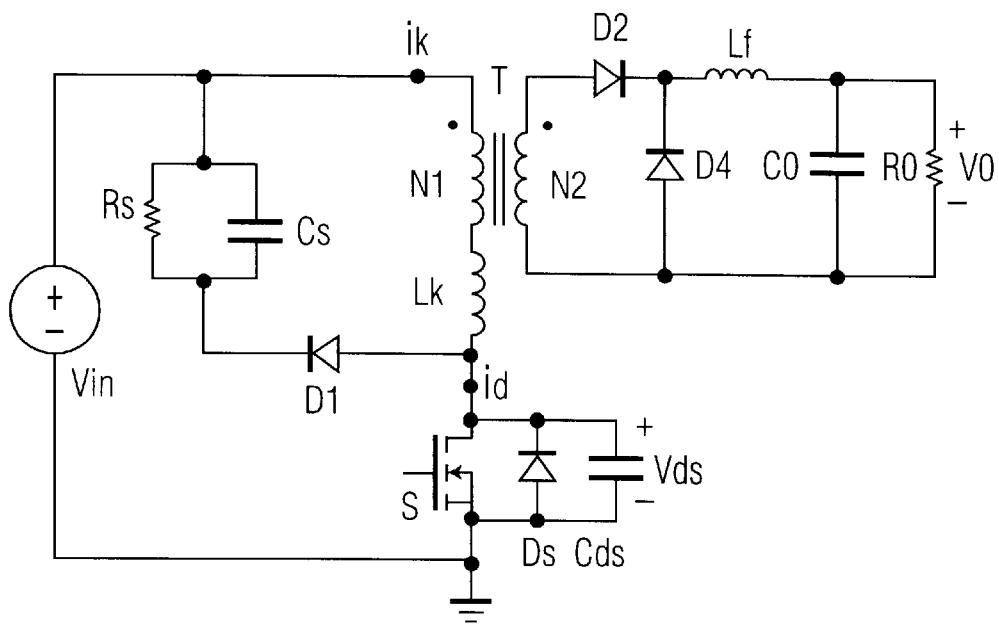
FIG. 3 shows a prior art capacitor-resistor-diode snubber network.

From the above description, it is clear that energy stored in the leakage inductance and the magnetizing inductance is recovered, and is fed to the input source. The voltage across switch is clamped by the clamping capacitor. Therefore, the circuit has higher power conversion efficiency than the circuit shown in FIG. 3. Compared with the forward DC/DC converter represented in FIG. 2A, only an additional capacitor is used.

EXAMPLE 2

Figure 6:
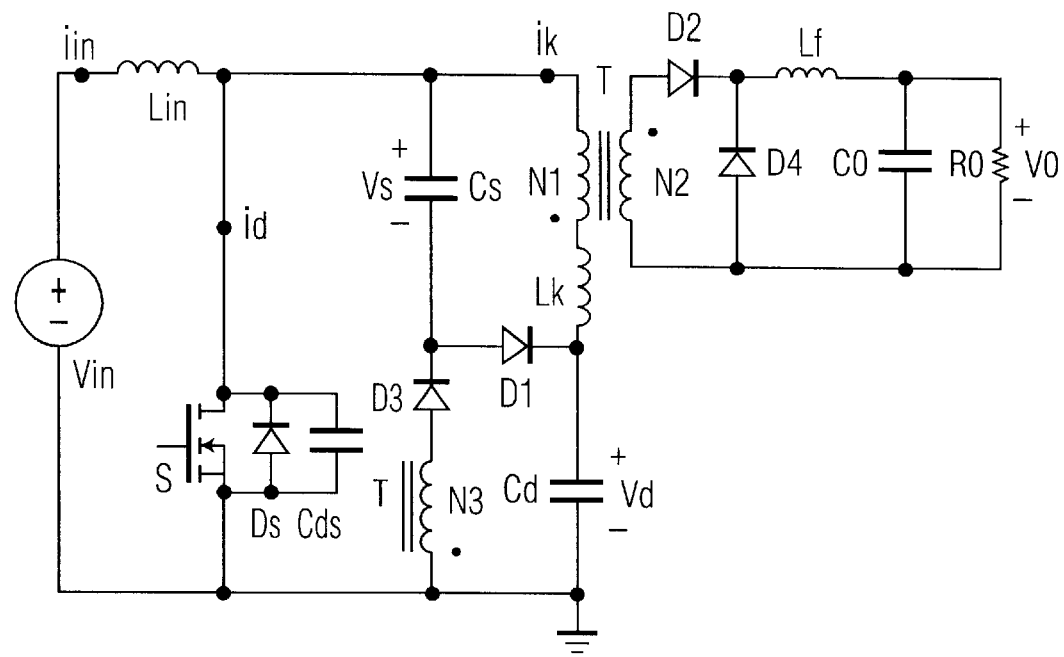
FIG. 6 shows a current fed power converter with clamping voltage according to the present invention.
Figure 7:
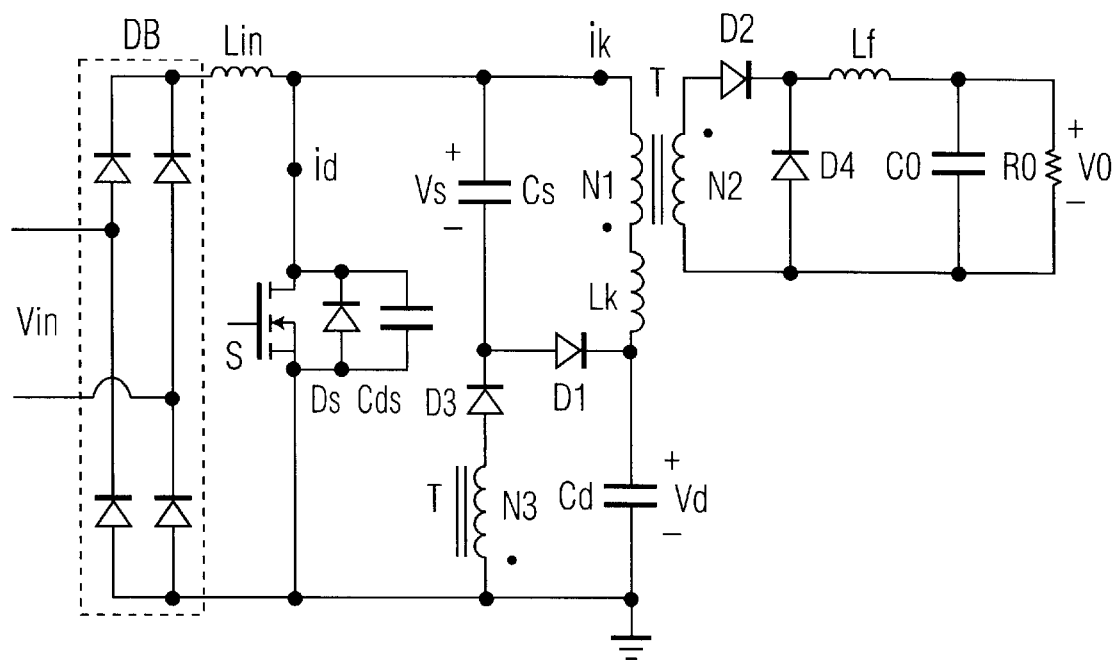
FIG. 7 shows a power factor correction circuit with clamping voltage according to the present invention.

In accordance with embodiments of the invention, the circuit according to example 1 provides a basis for enhancements, as shown in FIGS. 6 and 7, whose principle of operation is similar to FIG. 4.

When switch S is turned ON, the input source voltage $V_{in}$ charges inductor $L_{in}$, and the input current $i_{in}$ linearly increases. Capacitor $C_s$ discharges through switch S, diode D3 and winding N3. This discharging current is coupled to the winding N2 to supply the load. At the same time, the voltage $V_d$ is applied to the primary winding N1, and also supplies the load. When switch S is turned OFF, the inductor current $i_{in}$ charges capacitor $C_d$ through a loop $L_{in}$-N1-$L_k$-$C_d$-$V_{in}$. The leakage energy is transferred to the capacitor $C_s$ through diode D1 and the capacitor voltage $V_s$ is applied to the primary winding N1. When the induced voltage across winding N3 is higher than voltage $V_d$, diode D3 turns on and the magnetizing energy is then transferred to capacitor $C_d$. $C_d$, it is noted, is a relatively bulk capacitor. Therefore, both leakage energy and magnetizing energy are recovered, and the voltage across switch S is clamped.

Since the circuit according to the second embodiment is a current fed power converter, it is suitable for power factor correction applications. FIG. 7 shows the power factor correction circuit, provided by replacing the $V_{in}$ with AC line input and a full wave diode bridge rectifier DB as compared with FIG. 6.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A voltage boost feed forward converter circuit, having an active switch controlling a current through input inductor, a transformer having a primary winding, and an output circuit connected to a secondary winding, comprising:

a clamping capacitor and a first passive switch in series across the primary winding;

an auxiliary winding of the transformer and a second passive switch, in series, connected to the node between the clamping capacitor and first passive switch and ground;

said active switch being connected between ground and a side of the primary winding opposite said first passive switch; and a bulk capacitor forming a series loop including the active switch and primary winding.

2. The converter circuit according to claim 1, wherein said first and second passive switches each comprise a semiconductor diode.

3. The converter circuit according to claim 1, wherein said primary winding, secondary winding and auxiliary winding are each electrically isolated.

4. The converter circuit according to claim 1, wherein said active switch comprises a metal-oxide silicon field effect transistor (MOSFET).

5. The converter circuit according to claim 1, further comprising a control to drive said active switch according to a control signal.

6. The converter circuit according to claim 1, wherein said output circuit comprises a half-bridge rectifier across said secondary winding and a capacitor-inductor ripple filter.

7. The converter circuit according to claim 1, wherein said bulk capacitor has a larger capacitance than said clamping capacitor.

8. The feed forward converter circuit according to claim 1, wherein said auxiliary winding of the transformer, said second passive switch, said first passive switch, and said bulk capacitor form a series loop.

9. The feed forward converter circuit according to claim 1, wherein said auxiliary winding transfers energy from a switching transient of said active switch to said secondary winding.

10. The feed forward converter circuit according to claim 1, wherein the input inductor is magnetically isolated from said transformer.

11. The feed forward converter circuit according to claim 1, wherein said auxiliary winding of the transformer and said second passive switch are connected through said first passive switch to a common node of said primary winding and said bulk capacitor, said bulk capacitor being ground referenced.

12. The feed forward converter circuit according to claim 1, wherein said active switch is connected in series with said input inductor to a rectified output of a full wave rectifier.

13. The feed forward converter circuit according to claim 1, wherein said circuit is configured such that power is transferred from said primary winding to said secondary winding principally when said active switch is closed.

14. The feed forward converter circuit according to claim 1, wherein said active switch comprises a metal-oxide-silicon field effect transistor (MOSFET) having an intrinsic body diode.

15. The feed forward converter circuit according to claim 1, wherein said active switch comprises a metal-oxide-silicon field effect transistor (MOSFET) in parallel with a diode.

16. The feed forward converter circuit according to claim 1, wherein a plurality of secondary windings are provided.

17. The feed forward converter according to claim 1, wherein a leakage energy from the primary winding is transferred from said clamping capacitor to said auxiliary winding when the active switch is non-conducting, whereby said leakage energy is inductively coupled to the secondary winding.

18. A method of efficiently resetting a voltage boost forward DC/DC converter, having an active switch and a transformer, comprising: transferring power to a load through a primary winding of the transformer, discharging a clamping capacitor through a separate inductively linked winding of the transformer, and discharging a bulk capacitor during an active switch conduction cycle; and clamping a voltage across the active switch with the clamping capacitor, charging the clamping capacitor with a leakage inductance of the transformer, and charging the bulk capacitor during an active switch non-conduction cycle, to efficiently transfer energy corresponding to a switching transient to the load.

19. A method of efficiently snubbing an active switch in a forward converter having a transformer, comprising drawing current though an input inductor and transferring power to a load through a primary winding of the transformer and discharging a capacitor through a separate inductively linked winding of the transformer during an active switch conduction cycle; and clamping a voltage across the active switch with the capacitor and charging the clamping capacitor with a leakage inductance of the transformer, during an active switch non-conduction cycle, to efficiently transfer energy corresponding to a switching transient to the load while limiting maximum active switch voltage.

20. The method according to claim 19, further comprising the step of controlling the active switch to correct a power factor and achieve output regulation.

* * * * *